Patented May 22, 1945

2,376,337

UNITED STATES PATENT OFFICE 2,376,337

POLYMERIZATION OF CONJUGATED DIENES

George L. Browning, Jr., Akron, Ohio, assignor, by mesne assignments, to The B. F. Goodrich Company, Akron, Ohio, a corporation of New York No Drawing. Application March 14, 1941, Serial No. 383,349

8 Claims. (Cl. 260—84.5)

This invention relates to the polymerization of conjugated dienes, and particularly to a method whereby conjugated dienes may be polymerized in an aqueous emulsion to form products closely resembling natural crude rubber.

The emulsion polymerization of conjugated dienes either alone or in admixture with other conjugated dienes or vinyl-type comonomers to form compositions of matter more or less resembling rubber is well known. It has been commonly observed, however, that the products of such polymerization often resemble vulcanized rubber rather than natural crude rubber in respect to solubility, plasticity, and processing characteristics. Thus it has often been found that the polymers were insoluble in, and, in some cases, not even swelled by benzene or acetone, and that they were tough, nonplastic materials which either would not homogenize on a mill or which were very difficult to mill and subject to other ordinary processing operations.

I have now discovered a class of materials which modifies the emulsion polymerization of conjugated dienes in such a manner that polymers more nearly resembling natural crude rubber may be produced than when the polymerization is carried on in the absence of the materials of this invention. This class of materials, which I have termed "modifiers," consists of dialkylxanthogeno monosulfides. This class of materials has the structural formula

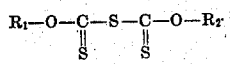

wherein $R_1$ and $R_2$ represent alkyl groups such as methyl, ethyl, n-propyl, isopropyl, ter.butyl, act.amyl, di-2-ethylhexyl, etc., and may represent the same or different groups.

The effect of the dialkylxanthogeno monosulfides is shown by the copolymerization in aqueous emulsion at 30° C. of 75 parts by weight of butadiene and 25 parts of acrylonitrile in the presence of hydrogen peroxide as an initiator and soap as an emulsifying agent. In the absence of any modifier, a non-plastic non-coherent material was obtained by coagulating the latex obtained as a product. When .35 part by weight of diisopropylxanthogene monosulfide were included in the emulsion during the polymerization, however, a coherent, plastic, rubber-like material was obtained. The unmodified polymer was practically insoluble in benzene, while the polymer obtained by practicing the method of this invention was 32% soluble in benzene. Furthermore, vulcanizates prepared from the modified polymer had a higher elongation than those prepared from the unmodified material. Similar results are obtained when other dialkyl-xanthogeno monosulfides such as diethylxanthogeno monosulfide or di-n-propylxanthogeno monosulfide are employed in place of the diisopropylxanthogeno monosulfide of the specific example. The modifiers of this invention may also be employed in the polymerization of other monomeric systems such as mixtures of butadiene and methyl methacrylate.

The proportion in which the modifier is included in the composition depends somewhat upon the properties desired in the product, the higher proportions of modifier in general producing softer, more soluble polymers. Very small amounts of modifier such as 0.1% or even less based on the monomers in the emulsion may profoundly affect the nature of the polymer produced, and amounts up to 5% or over may advantageously be employed.

Although the exact manner in which the modifiers of this invention function is not understood, it is believed from the nature of the changes in properties effected by polymerizing monomers in the presence of modifying agents that these materials in some way inhibit the formation of cross-linkages but still permit the formation of long, straight chains of polymerizable monomers. It is believed that in the absence of some agent which serves to prevent or inhibit cross-linkage, the products of emulsion polymerizations which have been carried to completion contain numerous cross-linkages which affect the properties of the polymer in much the same manner as the cross-linkages formed during the vulcanization of natural crude rubber with the aid of sulfur change the properties of the crude rubber. This theory explains why the polymers prepared in the presence of modifying agents are in general more plastic and more soluble than unmodified polymers. This theory is presented only by way of explanation and is not intended as a limitation on the invention, for regardless of the correctness of the theory, the inclusion in emulsion polymerization batches of a dialkylxanthogeno monosulfide produces the beneficial results heretofore described.

The modifying agents of this invention may be employed in the polymerization in aqueous emulsion of butadiene-1,3 hydrocarbons such as butadiene (butadiene-1,3), 2,3-dimethylbutadiene, isoprene, or piperylene either alone or in admixture with each other or with vinyl-type monomers. A number of materials which contain the group

wherein the dangling valences are attached to separate groups and which are believed to enter into polymeric chains only by 1,2-addition are known to be capable of copolymerizing with butadiene-1,3 hydrocarbons in aqueous emulsion. This class of monomers, herein called "vinyl-type monomers," includes such compounds as styrene, vinyl naphthalene, acrylonitrile, methacrylonitrile, methyl methacrylate, vinyl acetate, vinylidene chloride, methyl vinyl ketone, methyl vinyl ether, and similar unsaturated hydrocarbons, nitriles, esters, ketones, and ethers. These vinyl-type monomers are preferably, although not necessarily, employed in smaller amounts than the conjugated diene.

The polymerization of the above materials in aqueous emulsion may be effected by various initiators of polymerization such as per-compounds including hydrogen peroxide, ammonium persulfate, potassium persulfate, and other peracids, peroxides, and per-salts such as persulfates, perborates, percarbonates, and the like, as well as other types of initiators such as diazoaminobenzene, and dipotassium diazomethane disulfonate.

Any of the ordinary emulsifying agents such as fatty acid soaps including sodium oleate and sodium stearate, hymolal sulfates and aryl sulfonates including sodium lauryl sulfate and sodium isopropyl naphthalene sulfonate, and salts of organic bases containing long carbon chains such as the hydrochloride of diethylaminoethyloleylamide, trimethylcetylammonium methyl sulfate, etc. may be employed in the polymerization.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:

1. The method which comprises polymerizing a polymerizable butadiene-1,3 hydrocarbon in an aqueous emulsion in the presence of a small amount of a dialkylxanthogeno monosulfide.

2. The method which comprises copolymerizing in aqueous emulsion a polymerizable butadiene-1,3 hydrocarbon and a smaller amount of a vinyl-type monomer copolymerizable therewith in aqueous emulsion, in the presence of a small amount of a dialkylxanthogeno monosulfide.

3. The method which comprises copolymerizing in aqueous emulsion butadiene and a smaller amount of a vinyl-type monomer copolymerizable therewith in aqueous emulsion, in the presence of a small amount of a dialkylxanthogeno monosulfide.

4. The method which comprises copolymerizing butadiene and acrylonitrile in an aqueous emulsion in the presence of a small amount of a dialkylxanthogeno monosulfide.

5. The method which comprises copolymerizing butadiene and acrylonitrile in an aqueous emulsion in the presence of a small amount of diisopropylxanthogeno monosulfide.

6. The method which comprises copolymerizing butadiene and methyl methacrylate in an aqueous emulsion in the presence of a dialkylxanthogeno monosulfide.

7. The method which comprises polymerizing a polymerizable butadiene-1,3 hydrocarbon in an aqueous emulsion in the presence of a small amount of diisopropyl xanthogeno monosulfide.

8. The method which comprises polymerizing in aqueous emulsion a mixture of a polymerizable butadiene-1,3 hydrocarbon and a smaller amount of a monomer copolymerizable therewith in aqueous emulsion, in the presence of a small amount of a dialkylxanthogeno monosulfide.

GEORGE L. BROWNING, Jr.